(12) United States Patent  (10) Patent No.: US 8,196,841 B2
Ingvert  (45) Date of Patent: Jun. 12, 2012

(54) METHOD OF PROVIDING A PACKAGING LAMINATE WITH AN IDENTIFICATION CODE, METHOD OF IDENTIFYING A PACKAGE, AND PACKAGE WITH IDENTIFICATION CODE

(75) Inventor: Claes Ingvert, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 12/944,784

(22) Filed: Nov. 12, 2010

(65) Prior Publication Data

US 2011/0057026 A1  Mar. 10, 2011

Related U.S. Application Data

(62) Division of application No. 11/817,387, filed as application No. PCT/SE2006/000121 on Jan. 27, 2006, now abandoned.

(30) Foreign Application Priority Data

Mar. 2, 2005  (SE) ...................................... 0500472

(51) Int. Cl.
  *G06K 19/06* (2006.01)
(52) U.S. Cl. .................... 235/493; 235/487; 235/449
(58) Field of Classification Search .................. 235/449, 235/487, 493; 53/396, 51–53, 65; 493/11, 493/12, 16
  See application file for complete search history.

(56) References Cited

U.S. PATENT DOCUMENTS

| 3,878,367 A | | 4/1975 | Fayling et al. |
| 5,602,381 A | * | 2/1997 | Hoshino et al. ............... 235/493 |
| 5,762,263 A | | 6/1998 | Chamberlain, IV |
| 5,873,966 A | * | 2/1999 | Goldberg et al. ............... 156/64 |
| 6,478,229 B1 | | 11/2002 | Epstein |
| 6,720,866 B1 | | 4/2004 | Sorrells et al. |
| 6,881,450 B1 | * | 4/2005 | Texier ........................... 427/550 |
| 2010/0139216 A1 | * | 6/2010 | Johansson et al. ............... 53/450 |

FOREIGN PATENT DOCUMENTS

| DE | 101 58 403 A1 | 6/2003 |
| EP | 1095112 A1 | 5/2001 |
| TW | 494245 B | 7/2002 |
| WO | WO 00/23275 A1 | 4/2000 |
| WO | WO 01/60696 A1 | 8/2001 |
| WO | WO 03/045708 A2 | 6/2003 |
| WO | WO 03/095198 A1 | 11/2003 |

OTHER PUBLICATIONS

International Search Report for PCT/SE2006/000121, dated Jun. 9, 2006.
English-language translation of Taiwanese Office Action dated Mar. 30, 2007 issued in the corresponding Taiwanese Patent Application No. 095104787.

* cited by examiner

*Primary Examiner* — Karl D. Frech
(74) *Attorney, Agent, or Firm* — Buchanan Ingersoll & Rooney PC

(57) ABSTRACT

In a method of providing a packaging laminate with an identification code the packaging laminate is subjected to a magnetic field, thus magnetising a matrix of magnetic domains in the packaging laminate. Each magnetic domain is made up of a number of the magnetisable particles. A method of identifying a package is also disclosed. The package has walls of a packaging laminate comprising magnetisable particles. The method comprises the steps of subjecting the packaging laminate to a magnetising magnetic field, thus magnetising a matrix of magnetic domains in the packaging laminate, and detecting an emitted magnetic field emitted by the magnetic domains in the matrix. A package having an identification code is also described.

20 Claims, 2 Drawing Sheets

US 8,196,841 B2

METHOD OF PROVIDING A PACKAGING LAMINATE WITH AN IDENTIFICATION CODE, METHOD OF IDENTIFYING A PACKAGE, AND PACKAGE WITH IDENTIFICATION CODE

CROSS REFERENCE TO RELATED APPLICATION

This application is a Divisional of U.S. application Ser. No. 11/817,387, filed Aug. 29, 2007, which is the National Stage of International Application No. PCT/SE2006/000121, filed Jan. 27, 2006, the disclosures of both of which are incorporated herein by reference in their entirety, and claims priority to Swedish Application No. 0500472-6, filed Mar. 2, 2005, the disclosure of which is incorporated herein by reference in its entirety.

TECHNICAL FIELD OF THE INVENTION

The present invention relates to a method of providing a packaging laminate with an identification code. The invention also relates to a method of identifying a package, said package having walls of a packaging laminate comprising magnetisable particles.

Further, the present invention relates to a package having walls of a packaging laminate, said laminate comprising magnetisable particles.

BACKGROUND ART

It is known in the prior art to provide packages with identification codes, e.g. for identifying a particular location on the package or for identifying an individual package. One type of identification code is the optical code, usually a bar code. Bar codes can be printed on the package material along with the decor. A disadvantage in connection with bar codes is that optical vision is needed for reading the code. Therefore, the bar code has to be visible on the package and must not be covered by, e.g., a protective film. Another disadvantage is that the bar code is static and cannot be changed once it has been printed. Further, the bar code may be considered a disturbing element in the design of the package.

Another type of identification code is RFID, which uses transponders communicating via radio frequency. RFID codes can be read without direct optical vision and at a distance. However, they are undesirably expensive for many package applications. An aluminium layer in the packaging material, such as in aseptic packaging for non-refrigerated products, may inconveniently interfere with the RFID code. The RFID code may also be sensitive to certain products contained in the package.

Recently, a new packaging laminate has been developed, which is described in WO 03/095198. This packaging laminate contains magnetisable particles in at least one of its layers. The magnetisable particles have been used for marking a single point on the packaging laminate in order to facilitate printing in register with crease lines on the packaging laminate.

SUMMARY OF THE INVENTION

It is an object of the present invention to provide a package with an identification code, which does not need optical vision for reading and which can be produced in a cost effective way.

Another object is to provide a package with an identification code that can be changed during the production or life of a package.

Yet another object is to provide a package that is easily traceable at a relatively low cost.

In the inventive method of providing a packaging laminate with an identification code, the packaging laminate comprises magnetisable particles and is subjected to a magnetic field, thus magnetising a matrix of magnetic domains in the packaging laminate, each magnetic domain being made up of a number of the magnetisable particles. With this method, an identification code enabling a large number of individual codes can easily be provided.

In one variant of the method of the invention, the magnetisation of the matrix of magnetic domains is divided into at least two steps, wherein in a first step a first group of magnetic domains are magnetised, and in a second step a second group of magnetic domains are magnetised. In this manner, the identification code can be built up during different stages of treatment of the packaging laminate.

At least some of the magnetic domains in the first group may also belong to the second group. The magnetisation of some magnetic domains may thus be changed during different stages of treatment of the packaging laminate.

The inventive method of identifying a package comprises the steps of subjecting the packaging laminate to a magnetising magnetic field, thus magnetising a matrix of magnetic domains in the packaging laminate, each magnetic domain being made up of a number of the magnetisable particles, detecting an emitted magnetic field emitted by the magnetic domains in the matrix. With this method, a large number of packages can be individually coded and later identified. The magnetic identification code does not interfere with the decor and is readable without direct optical vision.

A variant of the method according to the invention further comprises the steps of determining the identity of the package based on the detected magnetic field, and reading data related to the identified package in a database. This method makes it possible to trace an individual package back to its production.

The magnetisation of the matrix of magnetic domains may be divided into at least two steps, wherein in a first step a first group of magnetic domains are magnetised, and in a second step a second group of magnetic domains are magnetised. Different parts of the identification code can thereby be created during different stages of the production of the package.

In one variant of the method, the first group of magnetic domains are magnetised before the packaging laminate is formed into the package and the second group of magnetic domains are magnetised after the packaging laminate has been formed into the package. This variant makes it possible to e.g. first store data on the package material in the identification code, and then to store data on the treatment of the finished package.

In another variant, the first and second groups of magnetic domains are magnetised at different stages of treatment of the packaging laminate, but before the packaging laminate is formed into the package. Thus, data may be stored in the identification code, e.g., on the material used in the packaging laminate and on a sterilisation procedure used for sterilising the material web.

It is also conceivable to magnetise the first and second groups of magnetic domains at different stages of treatment of the packaging laminate or the package, but after the packaging laminate is formed into a package. The identification code may in this way be used for storing first data on, e.g., a sterilisation of the empty package, and then, e.g., data on a heat treatment of the package once it is filled and sealed.

At least some of the magnetic domains in the first group may belong also to the second group. In this manner part of the identification code may be magnetised at one stage of the production of the package and altered at another stage of production.

The package of the invention has an identification code comprising a matrix of magnetic domains, each magnetic domain being made up of a number of the magnetisable particles. The identification code of the package may be used for tracing an individual package back to its production.

The matrix is advantageously a six by six matrix. This enables a large number of individual codes but can still be fitted on most package sizes.

BRIEF DESCRIPTION OF THE DRAWINGS

The invention will be described in more detail with reference to the appended schematic drawings, which show an example of a currently preferred embodiment of the invention.

DETAILED DESCRIPTION OF EMBODIMENTS OF THE INVENTION

Figure 1:
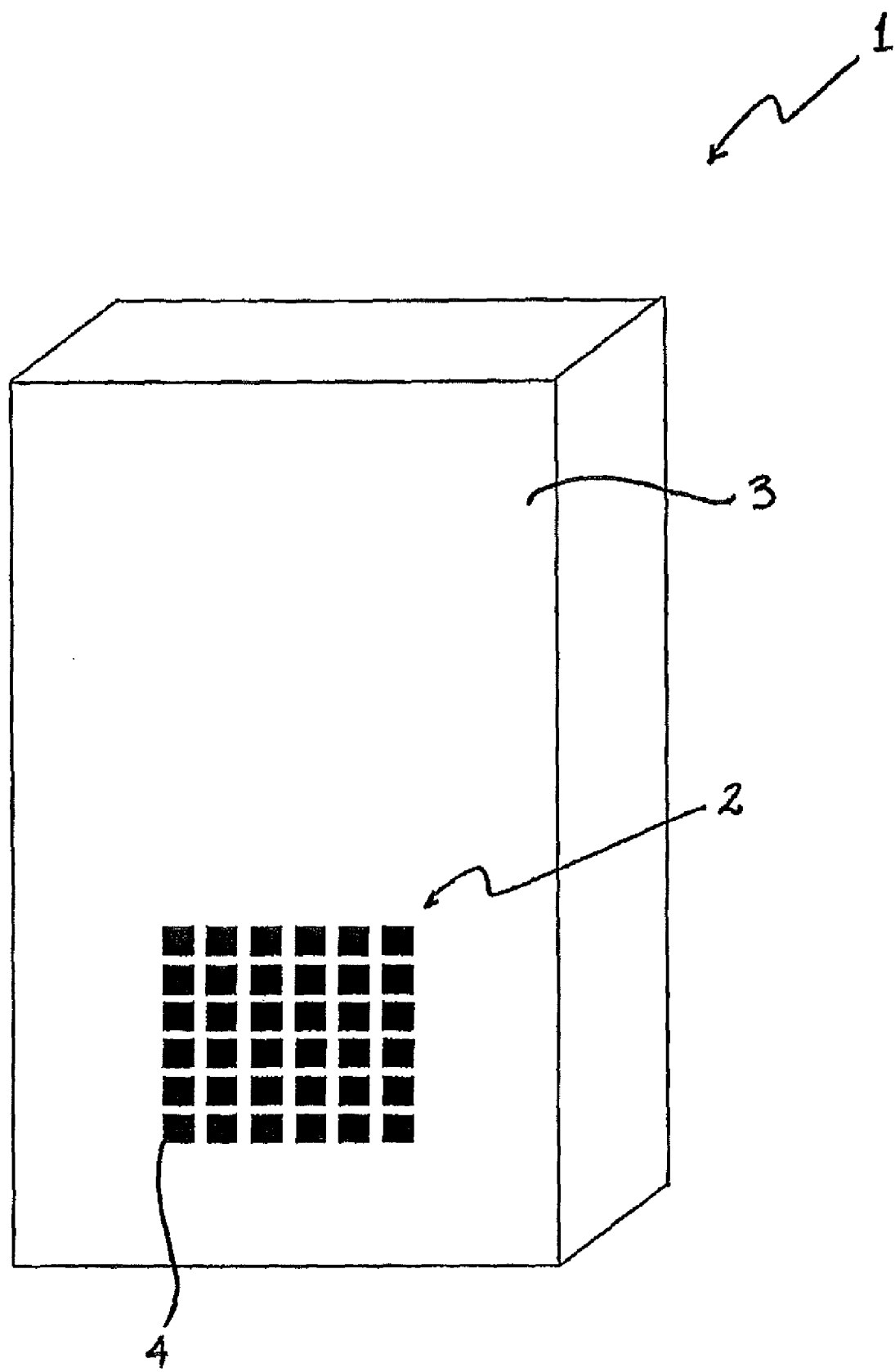
FIG. 1 is a schematic representation of a package with an identification code according to the invention.
Figure 2:
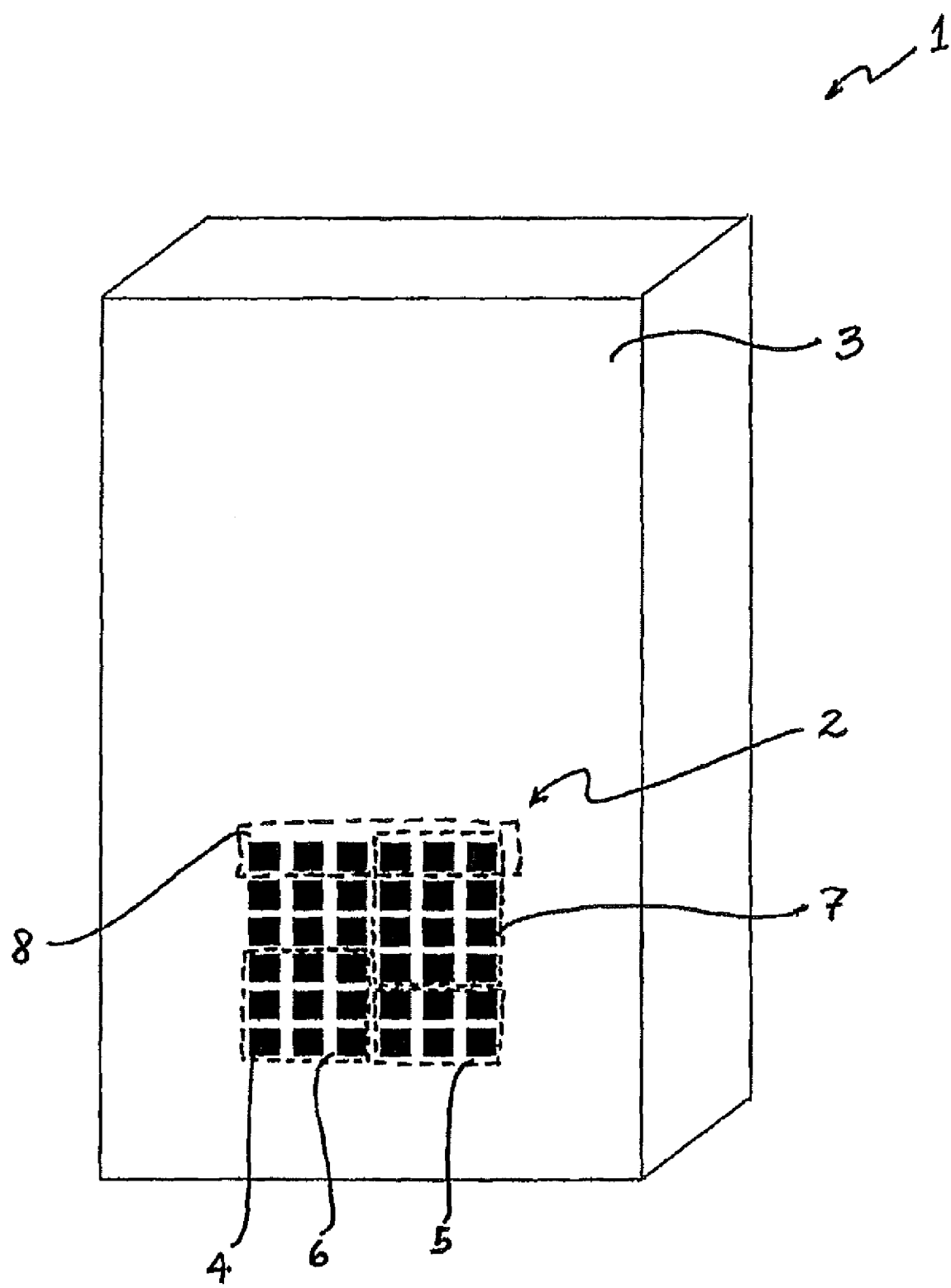
FIG. 2 is a schematic representation of a package with an identification code according to another embodiment of the invention.

The package 1 shown in FIG. 1 is a Tetra Brik® beverage package. The package 1 is made of a packaging laminate as described in Applicant's WO 03/095198. This packaging laminate has magnetisable particles embedded in at least one of its layers. An identification code 2 is provided on a wall 3 of the package 1 in the form of a six by six matrix of magnetic domains 4. Each magnetic domain 4 is made up of a number of magnetisable particles. When magnetising the matrix 2 for forming a code, each magnetic domain 3 can be given one of three values: plus, minus or no magnetic charge. Thus, with a six by six matrix, as many as $1.5 \cdot 10^{17}$ different codes can be created.

The identification code 2 may be used in two principally different ways.

Firstly, each package produced may be given an individual code. In this manner, traceability can be achieved, with the help of a database. Data on each individual package may be stored in the database during production of the packages. Later in the life cycle of the package, it may for some reason be necessary to trace the package back to its origin to determine parameters e.g. during sealing, filling, package forming, package material sterilisation or printing.

The identity of the package is determined by detecting the magnetic fields emitted by the magnetic domains 4 in the matrix 2. The package database is then interrogated for data on this specific package 1. If, for instance, the shelf life of the product in the package 1 has been found to be unusually short, the reason for this may be looked for in the conditions that prevailed during different stages of the production of the package.

Secondly, the identification code 2 may be used more independently, without the use of a database identifying individual packages 1. In this embodiment, different groups of magnetic domains 4 in the matrix 2 may be used for storing data on different stages of the production of the package. For instance, a first group 5 of magnetic domains 4 may be used for registering data on the type of packaging material used (thickness, type of plastic film, presence of aluminium layer etc.). A second group 6 of magnetic domains 4 may be used for registering data on the sterilisation of the material web. A third group 7 of magnetic domains 4 could be used for storing data on the contents of the package 1. Some magnetic domains 4 may belong to more than one group of magnetic domains 4. For example, a fourth group 8 of magnetic domains could be used for registering data on a possible treatment of the package 1 after filling, and this fourth group 8 could include some or all of the magnetic domains 4 in one or more of the other groups, e.g. the third group 7. In this manner, the magnetisation of some or all of the magnetic domains 4 may be changed a number of times during the production of the package 1, from the raw material web to the finished package 1.

A less complex identification code (not shown) may use a smaller matrix, e.g. a three by three matrix, when it is not necessary to identify individual packages, but only batches of production.

The number of magnetic domains 4 in the matrix 2 is theoretically limited only by the size of the area available on the package 1, the possible resolution of the magnetisation means and the detector used, and the distance necessary between the domains 4 for avoiding crosstalk. In practice, the size of the matrix will be limited by the size of the smallest package for which it is intended to be used.

The identification code 2 can be read regardless of whether the package 1 is standing up or lying on the side, as long as the orientation of the package 1 is known.

The magnetisation of the matrix 2 can be done using electrically changeable magnetisation devices formed in a corresponding matrix. In accordance with what type of information is to be recorded in the identification matrix, the magnetisation device can be arranged in the converting machine, in the package machine or along the conveyors after the filling machine.

The device used for reading the identification code may have magneto resistive sensors, GMR sensors or similar, formed into a matrix corresponding to the matrix 2 to be read. The sensors should be able to sense both static and dynamic fields, such that it is possible to read the identification code 2 when the package 1 is standing still or moving. The reading distance can be up to a couple of millimetres.

The sensors could also be arranged in a row or column, corresponding to a row or column in the matrix 2 to be read. The identification code 2 is in such case read by moving the package 1 past the sensors, or vice versa.

In a further embodiment, said magnetic domains can be given a level of plus and minus charge that afterwards can be detected. Thereby, the number of available coding combinations in a matrix increases dramatically, given the same number of magnetic domains. For example, if given three levels of charge, the possible charge in one domain is +3, +2, +1, 0, 1, 2, 3 equals seven possibilities for each magnetic domain. The number of charging levels can be more or less than the exemplified three, within the scoop of the invention. The number of charging levels can in practical use be limited by the resolution in the detector used and the distance between the detector and the matrix.

The invention is of course not limited to the specific shape of package shown in the drawings. The skilled person will realise that the identification code of the invention may be applied to any kind of package manufactured from a packaging material containing magnetisable particles.

The invention claimed is:

1. A method of identifying a package, said package having walls of a packaging laminate comprising magnetisable particles, the method comprising:

subjecting the packaging laminate to a magnetising magnetic field, thus magnetising a matrix of magnetic domains in the packaging laminate, each magnetic domain being made up of a number of the magnetisable particles, and detecting an emitted magnetic field emitted by the magnetic domains in the matrix.

2. A method as claimed in claim 1, further comprising:

determining an identity of the package based on the detected magnetic field, and reading data related to the identified package in a database.

3. A method as claimed in claim 2, wherein the magnetisation of the matrix of magnetic domains is divided into at least two steps, wherein in a first step a first group of magnetic domains are magnetised, and in a second step a second group of magnetic domains are magnetised.

4. A method as claimed in claim 1, wherein the magnetisation of the matrix of magnetic domains is divided into at least two steps, wherein in a first step a first group of magnetic domains are magnetised, and in a second step a second group of magnetic domains are magnetised.

5. A method as claimed in claim 4, wherein at least some of the magnetic domains in the first group belong also to the second group.

6. A method as claimed in claim 4, wherein the first group of magnetic domains are magnetised before the packaging laminate is formed into the package and the second group of magnetic domains are magnetised after the packaging laminate has been formed into the package.

7. A method as claimed in claim 6, wherein at least some of the magnetic domains in the first group belong also to the second group.

8. A method as claimed in claim 4, wherein the first and second groups of magnetic domains are magnetised at different stages of treatment of the packaging laminate, but before the packaging laminate is formed into the package.

9. A method as claimed in claim 8, wherein at least some of the magnetic domains in the first group belong also to the second group.

10. A method as claimed in claim 4, wherein the first and second groups of magnetic domains are magnetised at different stages of treatment of the packaging laminate or the package, but after the packaging laminate is formed into the package.

11. A method as claimed in claim 10, wherein at least some of the magnetic domains in the first group belong also to the second group.

12. A method of providing a packaging laminate with an identification code, wherein the packaging laminate comprises magnetisable particles, the method comprising subjecting the packaging laminate to a magnetic field, thus magnetising a matrix of magnetic domains in the packaging laminate, each magnetic domain being made up of a number of the magnetisable particles.

13. A method as claimed in claim 12, wherein the magnetisation of the matrix of magnetic domains is divided into at least two steps, wherein in a first step a first group of magnetic domains are magnetised, and in a second step a second group of magnetic domains are magnetised.

14. A method as claimed in claim 13, wherein at least some of the magnetic domains in the first group belong also to the second group.

15. A method as claimed in claim 13, wherein the first group of magnetic domains are magnetised before the packaging laminate is formed into a package and the second group of magnetic domains are magnetised after the packaging laminate has been formed into the package.

16. A method as claimed in claim 15, wherein at least some of the magnetic domains in the first group belong also to the second group.

17. A method as claimed in claim 13, wherein the first and second groups of magnetic domains are magnetised at different stages of treatment of the packaging laminate, but before the packaging laminate is formed into a package.

18. A method as claimed in claim 17, wherein at least some of the magnetic domains in the first group belong also to the second group.

19. A method as claimed in claim 13, wherein the first and second groups of magnetic domains are magnetised at different stages of treatment of the packaging laminate or a package, but after the packaging laminate is formed into the package.

20. A method as claimed in claim 19, wherein at least some of the magnetic domains in the first group belong also to the second group.

* * * * *